(12) United States Patent
Frick

(10) Patent No.: US 6,883,388 B2
(45) Date of Patent: Apr. 26, 2005

(54) SELF-CLEANING FLOW METER HAVING ADJACENT INLET AND OUTLET FLUID FLOW PASSAGEWAYS

(75) Inventor: Donald C. Frick, Richboro, PA (US)

(73) Assignee: World Wide Plastics, Inc., Trevose, PA (US)

( * ) Notice: Subject to any disclaimer, the term of this patent is extended or adjusted under 35 U.S.C. 154(b) by 0 days.

(21) Appl. No.: 10/436,589

(22) Filed: May 13, 2003

(65) Prior Publication Data

US 2004/0226387 A1 Nov. 18, 2004

(51) Int. Cl.[7] .................................................. G01F 1/22
(52) U.S. Cl. ................................................... 73/861.57
(58) Field of Search ............................. 73/861, 861.57, 73/861.55, 861.53, 861.52, 861.58, 232

(56) References Cited

U.S. PATENT DOCUMENTS

| 2,246,464 A | 6/1941 | Gerber |
| 2,377,861 A | 6/1945 | Brewer |
| 2,389,957 A | 11/1945 | Cox |
| 2,400,097 A | 5/1946 | Brewer |
| 2,417,352 A | 3/1947 | Cox |
| 4,102,189 A | 7/1978 | Cohrs |
| 4,111,046 A | 9/1978 | Amemori et al. |
| 5,186,058 A | 2/1993 | Lew |
| 6,308,582 B1 * | 10/2001 | Bender ..................... 73/861.57 |
| 6,327,915 B1 | 12/2001 | Van Cleve et al. |

* cited by examiner

*Primary Examiner*—Edward Lefkowitz
*Assistant Examiner*—Takisha Miller
(74) *Attorney, Agent, or Firm*—Volpe and Koenig, P.C.

(57) ABSTRACT

A flow meter having a float slideably mounted along a float rod centrally located within a flow meter body, the float assuming a height along the flow meter float rod representative of fluid pressure. The float preferably has a cylindrical-shaped through-bore. The float rod preferably has a polygonal-shaped perimeter over substantially its entire length permitting fluid flow between the float rod outer diameter (OD) and the float inner diameter (ID) to dislodge any particulate, thereby serving a self-cleaning function. The float rod is preferably hollow and closed at its upper end and having flow inlet and flow outlet openings near its lower end communicating with a flow chamber which conveniently provides the inlet and outlet flows at the lower end of the flow meter.

17 Claims, 2 Drawing Sheets

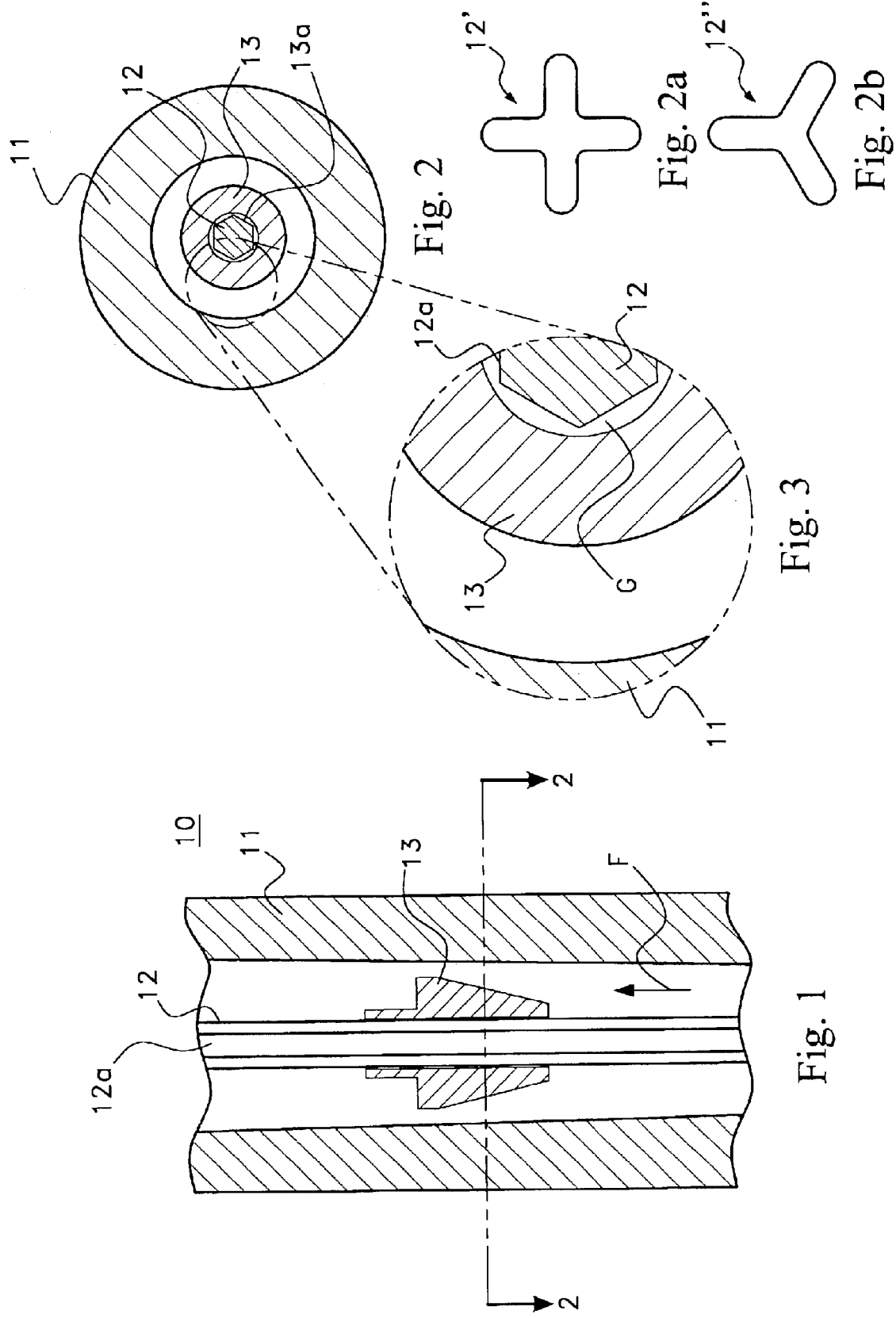

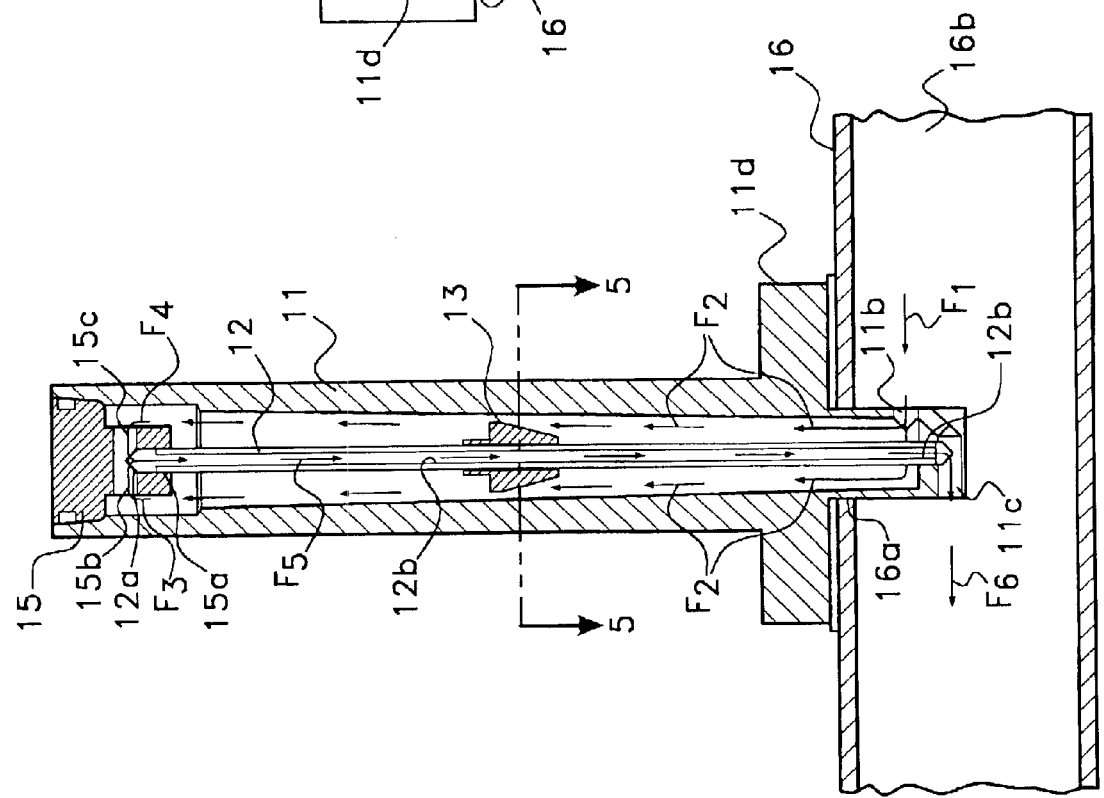

SELF-CLEANING FLOW METER HAVING ADJACENT INLET AND OUTLET FLUID FLOW PASSAGEWAYS

FIELD OF INVENTION

The present invention relates to flow meters. More particularly the present invention relates to flow meters having a novel self-cleaning function and further providing a unique passageway arrangement wherein inlet and outlet openings are conveniently arranged at one end of the flow meter.

BACKGROUND

Conventional flow meters typically utilize a float member slideable along a float rod and movable therealong to a position representative of flow rate.

The fluid passing through the flow meter may, however, carry particulate which may become lodged between the float and float rod thereby retarding free movement of the float rod, to yield an incorrect reading.

It is also desirable to provide a flow meter having a simplified and desirable flow pattern.

SUMMARY

The present invention provides a flow meter in which the inner periphery of the float and the outer periphery of the float rod are designed to provide a self-cleaning flow therebetween as well as providing a flow pattern utilizing the float rod in which both incoming and outgoing flows are conveniently arranged at one end of the flow meter to simplify design.

BRIEF DESCRIPTION OF THE FIGURES

The present invention will be understood from consideration of figures wherein like elements are designated by like numerals and, wherein:

FIG. 1 shows a vertical section of a flow meter embodying the principles of the present invention.

FIG. 2 is a horizontal section of the flow meter of FIG. 1 looking in the direction of arrows 2—2.

FIGS. 2a and 2b show alternative embodiments of the float rod of FIG. 2.

FIG. 3 in an enlarged view of a portion of the horizontal section of FIG. 2.

FIG. 4 is a vertical section of a flow meter designed in accordance with the principles of the present invention and showing the flow path therethrough.

FIG. 5 is a horizontal section of the flow meter of FIG. 4 looking in the direction of arrows 5—5.

DETAILED DESCRIPTION OF THE INVENTION AND PREFERRED EMBODIMENTS THEREOF

Making reference to FIGS. 1 and 2, the flow meter 10 shown therein is comprised of a hollow tubular-shaped outer flow meter body 11 which is typically formed of a clear glass or plastic material. A float rod 12 located along the central longitudinal axis of outer body 11 slideably receives a float 13 having a hollow through-bore 13a enabling float 13 to be freely slideable along float rod 12. Float rod 12 may be solid or may have a hollow interior 12a. The nature of the float rod interior is irrelevant insofar as the effectiveness of the invention of FIG. 1 is concerned.

In a preferred embodiment, through-bore 13a of float valve 13 has a substantially circular cross-section whereas the outer perimeter of float rod 12, in one preferred embodiment, is provided with a regular polygonal shape such as, for example, a hexagonal or six-sided regular polygon. As shown in FIGS. 2 and 3 the polygonal shape of the outer periphery 12a of float rod 12 cooperates with the circular-shaped through-bore 13a to provide a plurality of clearance regions or gaps G which permit the flow of fluid therethrough to prevent dirt and/or oil buildup in the region between the outer periphery 12a of the float rod 12 and the interior periphery of the float 13. The through-bore 13a of the float 13 and the outer periphery of the float rod are designed so that their longitudinal axes are substantially co-linear. In addition, it should be understood that the polygonal shape of the float rod outer periphery minimizes the surface contact between the inner periphery of the float and the outer periphery of the float rod, thus further minimizing dirt and oil buildup therebetween and significantly reducing the possibility of foreign matter build-up at such a small surface contact area.

As an alternative embodiment, the through-bore 13a of float 13 may be provided with a polygonal shape, such as a hexagonal shape while the outer periphery of the float rod may be provided with a circular shape which, in addition to providing fluid flow therebetween likewise minimizes the amount of surface contact therebetween. The aforementioned shapes further substantially align the longitudinal axes of the float and float rod along a common axis, i.e., in other words the axes of the float and float rod are substantially co-linear.

Other shapes may be utilized to accomplish the same result. Note for example FIGS. 2a and 2b which show alternating projecting portions and recesses, the curved projecting portions providing limited surface contact with the interior periphery of the float rod 13 while the recesses permit fluid flow therethrough to thereby provide the self-cleaning function.

FIGS. 4 and 5 show another embodiment of the present invention in which the flow meter 10 is provided with a float rod 12 having a hollow interior 12b.

A closure cap 15 seals the top end of the flow meter body 11. The lower end thereof is provided with an opening 15a which receives the upper end of float rod 12. The closure cap is further provided with diametrically opposed openings 15b, 15c whose longitudinal axes are transverse to the longitudinal axis of float rod 12. The openings 15b and 15c communicate with opening 15a.

The lower end of the flow meter body 11 is closed. The closed lower end, however, is provided with an inlet opening 11b communicating with the interior of flow meter body 11 and an outlet opening 11c communicating with the lower, open end of the hollow float rod 12. The flow meter body 11 is supported upon housing 16 by enlarged portion 11d.

The bottom portion of the flow meter body 11 extends into an opening 16a in an upper end of a housing 16 which serves as a support for the flow meter as well as having hollow interior 16b which serves as a conduit for fluid flow.

The operation is such that fluid flows in the direction shown by arrow F1, entering the opening 11b and flowing upwardly through the hollow region between the inner wall of flow meter body 11 and the outer wall of float rod 12, as represented by arrows F2. The fluid flow acts upon float 13 which assumes an equilibrium position which is a function of flow rate. Gradations (not shown for purposes of simplicity) are provided along the flow meter body 11, which is typically transparent, to provide an indication of flow rate.

The upward flow, as shown by arrows F2, is diverted into the openings 15b, 15c as shown by arrows F3, F4 and enter into the top, open end of float rod 12 and flow downwardly therethrough as shown by arrows F5. The flow leaves the lower end of float rod 12 entering passageway 11c and ultimately flowing in the direction shown by arrow F6.

The arrangement shown in FIGS. 4 and 5 provides a flow meter designed to have fluid flow enter and exit at the bottom of the flow meter thereby eliminating the need for an outflow conduit at the upper end of the flow meter.

What is claimed is:

1. A flow meter, comprising:
   a flow meter body having a through-bore for fluid flow therethrough;
   a float rod positioned within said through-bore;
   a float having a through-bore, said float rod extending through the float through-bore enabling the float to move freely along said float rod to a position therealong which is determined by flow rate of a fluid passing therethrough;
   an interior periphery of the float and an exterior periphery of the float rod having different cross-sections so that the cross-sections of the float rod and float limit surface contact therebetween and further permit fluid flow through gap regions between points of surface contact to provide a self-cleaning function;
   the exterior periphery of the float rod having a first constant cross-section measured in a longitudinal direction and the interior periphery of the float having a second constant cross-second measured in a longitudinal direction to thereby maintain the self-cleaning function.

2. The apparatus of claim 1 wherein said self-cleaning function prevents buildup of foreign matter between the inner periphery of the float and the outer periphery of the float rod due to the fluid flow through the gap regions.

3. The apparatus of claim 1 wherein said fluid flow through the gap regions clears foreign matter therefrom, which includes particulate and oil.

4. The flow meter of claim 1 wherein the inner periphery of the float is circular and the outer periphery of the float rod is polygonal.

5. The flow meter of claim 1 wherein the inner periphery of the float is polygonal and the outer periphery of the float rod is circular.

6. The flow meter of claim 4 wherein the polygonal periphery is a regular polygon having between 4 and 10 equal sides.

7. The flow meter of claim 5 wherein the polygonal periphery is a regular polygon having between 4 and 10 equal sides.

8. The flow meter of claim 6 wherein the polygonal periphery is hexagonal.

9. The flow meter of claim 7 wherein the polygonal cross-section is hexagonal.

10. The flow meter of claim 1 wherein the through-bore of the float has a circular cross-section and the float rod has an exterior periphery of alternating undulations and projections.

11. The flow meter of claim 1 wherein the relationship of the through bore and outer periphery of the float rod is selected to maintain longitudinal axes of the float rod and float to be substantially co-axial.

12. A flow meter, comprising:
    a flow meter body having a through-bore;
    a hollow elongated float rod extending through the through-bore of the flow meter body;
    a float having a through-bore receiving said float rod enabling the float to be slideably therealong wherein the float assumes a position along the float rod which is representative of a flow rate of a fluid moving through a hollow region between said float rod and said flow meter body through-bore;
    an upper end of the flow meter body having a closure cap which receives and supports an upper end of the float rod, said closure cap having inlet openings communicating at an outer radial end with the region between the flow meter body through-bore and the outer periphery of the float rod and communicating at an inner radial end with an opening in an upper end of the hollow float rod;
    a lower end of the flow meter body supporting a lower end of the float rod having a first passage communicating at one end with a fluid flow conduit and communicating at another end with the region between the flow meter body through-bore and the outer periphery of the float rod and having a second passage communicating at one end with an open lower end of the hollow float rod and communicating at another end with said fluid flow conduit whereby fluid entering the first passage in the flow meter body lower end flows upwardly through the flow meter in the region surrounding the float rod, enters the open upper end of the float rod and ultimately passes through the open lower end of the float rod to return to the fluid conduit.

13. The flow meter of claim 12 wherein said flow meter body has an enlarged outer portion mounted upon said fluid conduit for supporting the flow meter body on the fluid conduit.

14. The flow meter of claim 12 wherein said closure cap supports and aligns the upper end of the float rod so that a float rod longitudinal axis and a longitudinal axis of the flow meter body are substantially coaxial.

15. The flow-meter of claim 12 wherein said body lower end supports and aligns the upper end of the float rod so that a float rod longitudinal axis and a longitudinal axis of said flow meter body are substantially coaxial.

16. The flow-meter of claim 12 wherein an interior periphery of the float and an exterior periphery of the float rod having different cross-sections so that the cross-sections of the float rod and float limit surface contact therebetween and further permit fluid flow through regions between points of surface contact to provide a self-cleaning function.

17. The flow meter of claim 1 an upper end of the flow meter body having a closure cap which receives and supports an upper end of the float rod, said closure cap having inlet openings communicating at an outer radial end with the region between the flow meter body through-bore and the outer periphery of the float rod and communicating at an inner radial end with an opening in an upper end of the hollow float rod.

* * * * *